(12) United States Patent　　　　(10) Patent No.:　US 12,664,709 B2

Teshigawara　　　　　　　　　　　　　(45) Date of Patent:　Jun. 23, 2026

(54) IMAGE RECONSTRUCTION METHOD AND IMAGE RECONSTRUCTION PROCESSING SYSTEM

(71) Applicant: CANON KABUSHIKI KAISHA, Tokyo (JP)

(72) Inventor: Manabu Teshigawara, Otawara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 176 days.

(21) Appl. No.: 18/519,730

(22) Filed: Nov. 27, 2023

(65) Prior Publication Data

US 2024/0177376 A1　　May 30, 2024

(30) Foreign Application Priority Data

Nov. 29, 2022　(JP) ................................. 2022-190602

(51) Int. Cl.
　　*G06T 12/20*　　　　(2026.01)
(52) U.S. Cl.
　　CPC .......... *G06T 12/20* (2026.01); *G06T 2210/41* (2013.01); *G06T 2211/40* (2013.01)
(58) Field of Classification Search
　　CPC ............... G06T 11/006; G06T 2210/41; G06T 2211/40
　　See application file for complete search history.

(56) References Cited

U.S. PATENT DOCUMENTS

| | | | | |
|---|---|---|---|---|
| 11,501,195 | B2 * | 11/2022 | Rose ....................... | G06N 20/00 |
| 2009/0190833 | A1 * | 7/2009 | Alvino ................... | G06V 10/30 |
| | | | | 382/173 |
| 2010/0020931 | A1 | 1/2010 | Otto et al. | |
| 2011/0097007 | A1 * | 4/2011 | Zeng .................... | A61B 6/5258 |
| | | | | 382/260 |
| 2017/0300808 | A1 * | 10/2017 | Ronagh ................ | G06N 3/0475 |
| 2017/0323195 | A1 * | 11/2017 | Crawford ............... | G06N 3/088 |
| 2020/0090384 | A1 * | 3/2020 | Atria ...................... | B25J 9/1697 |
| 2020/0242816 | A1 | 7/2020 | Yang et al. | |
| 2021/0241143 | A1 | 8/2021 | Amin | |
| 2022/0218222 | A1 * | 7/2022 | Kermani ................ | A61B 5/055 |
| 2023/0342416 | A1 * | 10/2023 | Ide .......................... | G06F 17/16 |
| 2024/0249143 | A1 * | 7/2024 | Dalli ........................ | G06N 3/09 |
| 2025/0045947 | A1 * | 2/2025 | Ihara ....................... | G06T 7/292 |

OTHER PUBLICATIONS

Sundermann E, Lemahieu Il. PET image reconstruction using simulated annealing. InMedical Imaging 1995: Image Processing May 12, 1995 (vol. 2434, pp. 378-386). SPIE.*

* cited by examiner

*Primary Examiner* — Xuemei G Chen
(74) *Attorney, Agent, or Firm* — Oblon, McClelland, Maier & Neustadt, L.L.P.

(57)　　　　　　ABSTRACT
An image reconstruction method of an embodiment is to perform PET image reconstruction based on an objective function that solves a combinatorial optimization problem. The image reconstruction method of the embodiment includes a step of obtaining detection data and a step of performing PET image reconstruction by solving a combinatorial optimization problem based on the objective function into which the detection data is incorporated.

11 Claims, 8 Drawing Sheets

FIG.5

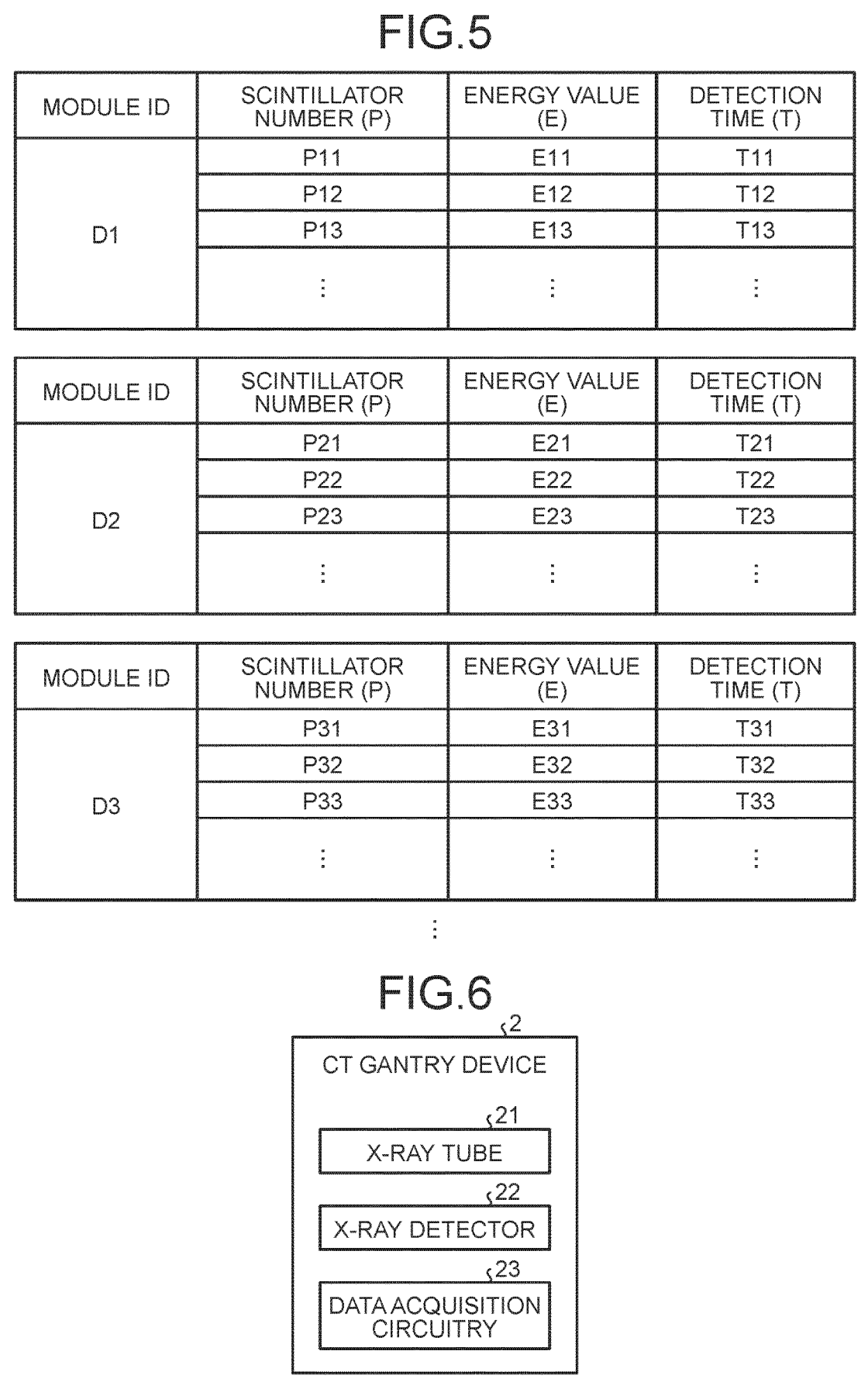

| MODULE ID | SCINTILLATOR NUMBER (P) | ENERGY VALUE (E) | DETECTION TIME (T) |
|---|---|---|---|
| | P11 | E11 | T11 |
| | P12 | E12 | T12 |
| D1 | P13 | E13 | T13 |
| | ⋮ | ⋮ | ⋮ |

| MODULE ID | SCINTILLATOR NUMBER (P) | ENERGY VALUE (E) | DETECTION TIME (T) |
|---|---|---|---|
| | P21 | E21 | T21 |
| | P22 | E22 | T22 |
| D2 | P23 | E23 | T23 |
| | ⋮ | ⋮ | ⋮ |

| MODULE ID | SCINTILLATOR NUMBER (P) | ENERGY VALUE (E) | DETECTION TIME (T) |
|---|---|---|---|
| | P31 | E31 | T31 |
| | P32 | E32 | T32 |
| D3 | P33 | E33 | T33 |
| | ⋮ | ⋮ | ⋮ |

| COINCIDENCE No. | SCINTILLATOR NUMBER (P) | ENERGY VALUE (E) | DETECTION TIME (T) | SCINTILLATOR NUMBER (P) | ENERGY VALUE (E) | DETECTION TIME (T) |
|---|---|---|---|---|---|---|
| 1 | P11 | E11 | T11 | P22 | E22 | T22 |
| 2 | P12 | E12 | T12 | P32 | E32 | T32 |
| 3 | P13 | E13 | T13 | P33 | E33 | T33 |
| ... | ... | ... | ... | ... | ... | ... |

IMAGE RECONSTRUCTION METHOD AND IMAGE RECONSTRUCTION PROCESSING SYSTEM

CROSS-REFERENCE TO RELATED APPLICATIONS

This application is based upon and claims the benefit of priority from Japanese Patent Application No. 2022-190602, filed on Nov. 29, 2022; the entire contents of which are incorporated herein by reference.

FIELD

Embodiments described herein and in the drawings relate generally to an image reconstruction method and an image reconstruction processing system.

BACKGROUND

As an image reconstruction method in existing imaging diagnostic systems, for example, statistical image reconstruction is mostly used in positron emission tomography (PET) systems. An exemplified example of the fundamental method is maximum likelihood estimation-expectation maximization (ML-EM). The ML-EM is carried out by employing the successive approximation method and generally required to take tens to hundreds of iterations in order to reach convergence of pixel values that are acceptable for the intended use. From a practical standpoint, OS-EM with the update rate of pixel values, which is increased by the recombination of loops in the algorithm of ML-EM, is often used in practice. However, OS-EM does not mathematically guarantee the convergence of the pixel values at the limit of the number of iterations, and the pixel values generally diverge after a certain number of iterations. Therefore, the behavior of convergence and divergence of the pixel values is observed by the person who performs the calculation from the viewpoint of image quality to set the number of iterations. For this reason, the operation is carried out without specific logical criteria for the convergence of the pixel values.

As mentioned above, ML-EM has an issue in that a large number of iterations are required before the convergence. In addition, OS-EM, which is introduced to accelerate the calculation speed, has an issue in that calculation is not guaranteed to converge and diverges after a certain number of iterations in general.

BRIEF DESCRIPTION OF THE DRAWINGS

FIG. 5 is a diagram illustrating an example of counting information according to the first embodiment;

FIG. 6 is a diagram illustrating an example of a configuration of a CT gantry device according to the first embodiment;

FIG. 8 is a diagram illustrating an example of a time-series list of coincidence counting information in the first embodiment;

DETAILED DESCRIPTION

Figure 1:
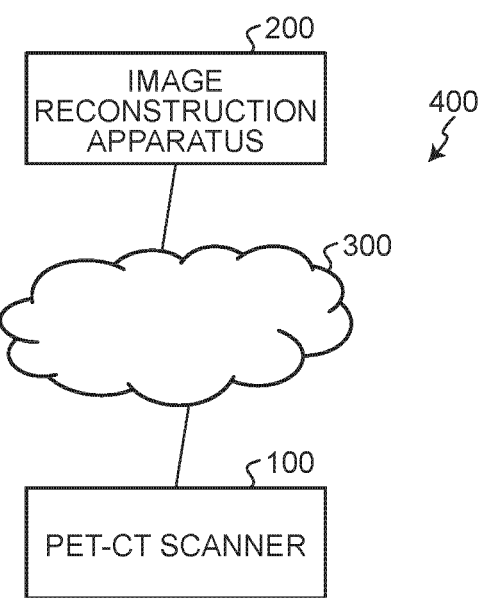
FIG. 1 is a diagram illustrating an example of an architecture for an image reconstruction processing system according to a first embodiment.

An object to solve a problem of the present embodiment is to reduce the time required for PET image reconstruction while removing the imprecision of a convergence criterion of pixel values. However, objects to solve the problem by embodiments disclosed herein and in the drawings are not limited to the above-mentioned object. An object corresponding to each effect of each configuration illustrated in the embodiments described later can also be positioned as another object.

An image reconstruction method of an embodiment is to perform PET image reconstruction based on an objective function that solves a combinatorial optimization problem. The image reconstruction method of the embodiment includes a step of obtaining detection data and a step of performing PET image reconstruction by solving a combinatorial optimization problem based on the objective function into which the detection data is incorporated.

Hereinbelow, a detailed description of embodiments of the image reconstruction method and an image reconstruction processing system will be described with reference to the accompanying drawings.

First Embodiment

FIG. 1 is a diagram illustrating an example of an architecture for an image reconstruction processing system 400 according to a first embodiment. As illustrated in FIG. 1, the image reconstruction processing system 400 is provided with a PET-computed tomography (CT) scanner 100 and an image reconstruction apparatus 200. The PET-CT scanner 100 and the image reconstruction apparatus 200 are connected via a network 300 such as the Internet and can communicate with each other. In other words, the image reconstruction apparatus 200 is connected to the PET-CT scanner 100 via the network 300 and is an example of a reconstruction processing unit that performs image reconstruction based on detection data $g_i$ described later. The image reconstruction apparatus 200 performs the image reconstruction based on processing executed by a quantum computer or a pseudo-quantum computer.

In the present embodiment, the PET-CT scanner 100 transmits a time-series list of coincidence counting information to the image reconstruction apparatus 200. The image reconstruction apparatus 200 then performs the service of PET image reconstruction by using the time-series list of coincidence counting information. In other words, the image reconstruction apparatus 200 functions as a server that provides the above-mentioned service in cloud computing. The image reconstruction apparatus 200 then transmits PET image data obtained by PET image reconstruction to the PET-CT scanner 100. The PET-CT scanner 100 then displays a PET image based on the PET image data. The PET-CT scanner 100 is an example of a medical diagnostic imaging apparatus.

Figure 2:
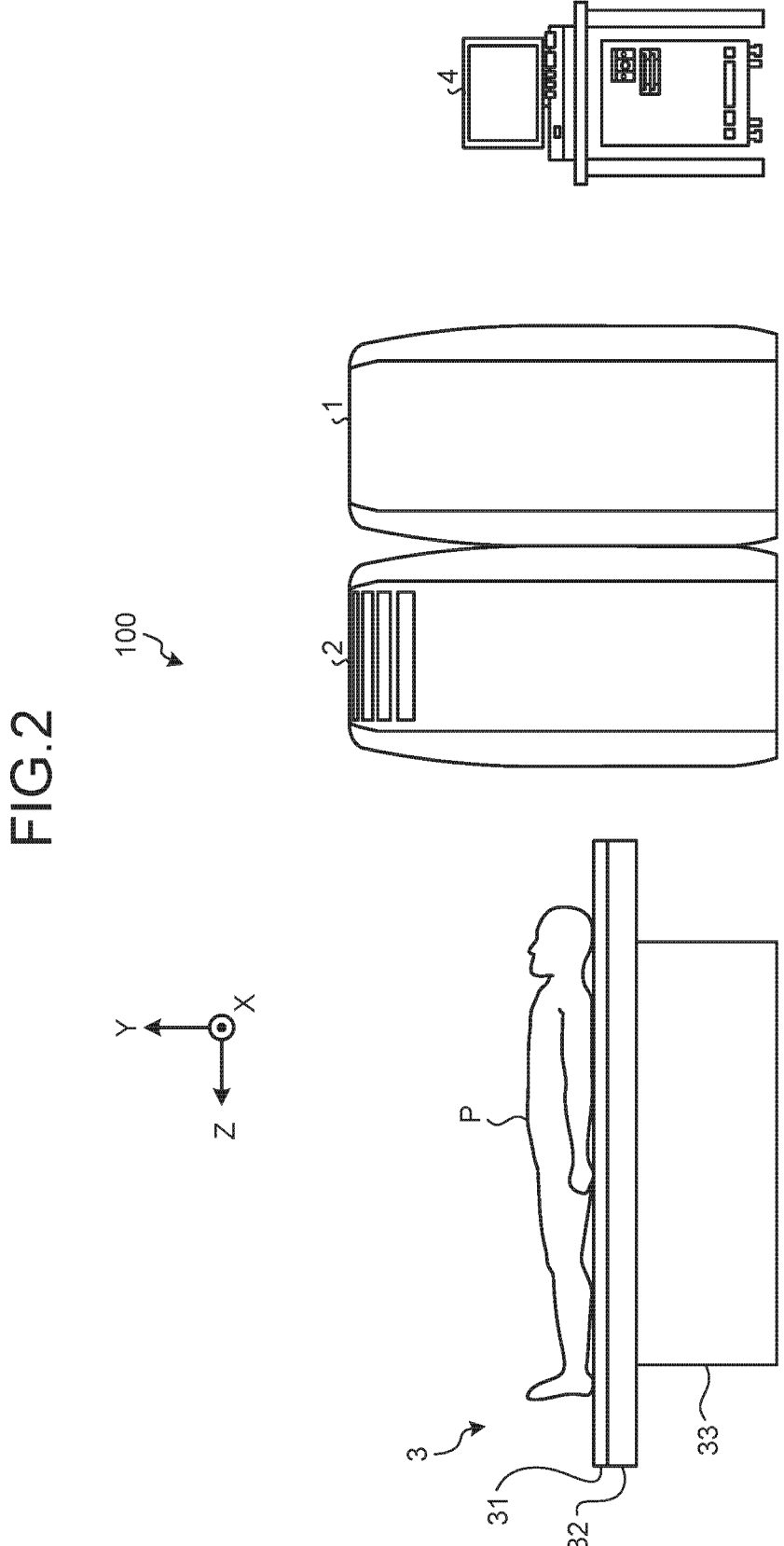
FIG. 2 is a diagram illustrating an example of the overall configuration of a PET-CT scanner according to the first embodiment.

Next, the overall configuration of the PET-CT scanner 100 according to the first embodiment will be described with reference to FIG. 2. FIG. 2 is a diagram illustrating an example of the overall configuration of the PET-CT scanner 100 according to the first embodiment. As illustrated in FIG. 2, the PET-CT scanner 100 according to the first embodiment includes a PET gantry device 1, a CT gantry device 2, a couch 3, and a console device 4. A drug (radiopharmaceutical) labeled with a positron-emitting radionuclide is administered to a subject P. The PET-CT scanner 100 is an example of a medical diagnostic imaging apparatus.

Figure 3:
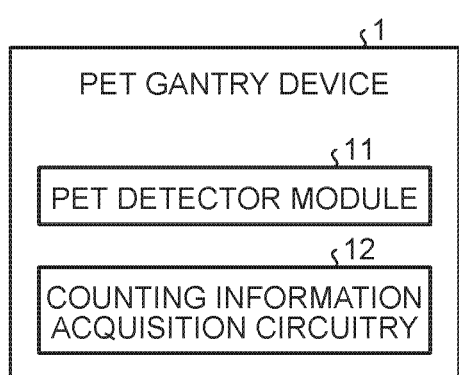
FIG. 3 is a diagram illustrating an example of a configuration of a PET gantry device according to the first embodiment.
Figure 4:
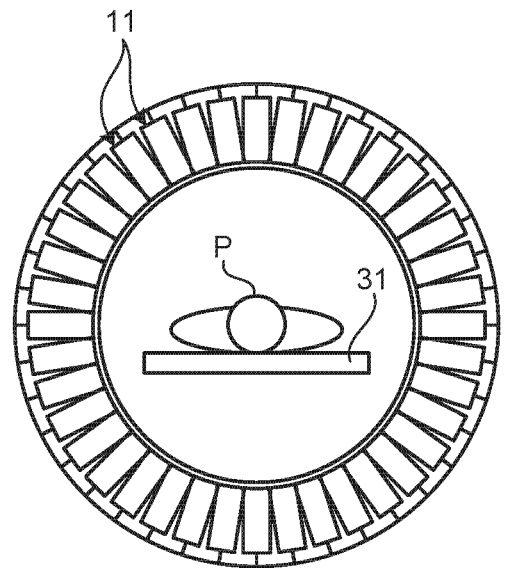
FIG. 4 is a diagram illustrating the example of the configuration of the PET gantry device according to the first embodiment.

The PET gantry device 1 is a device that detects a pair of gamma rays (pair annihilation gamma ray) emitted by the positron-emitting radionuclide, taken up by living tissues, generates counting information from gamma-ray detection signals, and acquires the counting information. FIGS. 3 and 4 is diagrams illustrating an example of a configuration of the PET gantry device 1 according to the first embodiment.

The PET gantry device 1 includes a PET detector module 11 and a counting information acquisition circuitry 12, as illustrated in FIG. 3. For example, as illustrated in FIG. 4, in the PET gantry device 1, a plurality of the PET detector modules 11 are arranged to surround the subject P in a ring shape. The PET detector modules 11 convert gamma rays emitted from the inside of the subject P into light and convert the light into electrical signals (detection signals). The PET detector modules 11 then transmit the detection signals to the counting information acquisition circuitry 12.

The counting information acquisition circuitry 12 generates counting information from the detection signals output from the PET detector modules 11 and stores the generated counting information in a memory 41, which is provided in the console device 4 and will be described later.

For example, the counting information acquisition circuitry 12 generates counting information from the detection signals output from the PET detector modules 11 to acquire the counting information. This counting information includes gamma-ray detection positions, energy values, and detection times. FIG. 5 is a diagram illustrating an example of counting information according to the first embodiment. For example, as illustrated in FIG. 5, the counting information includes scintillator numbers (P), energy values (E) and detection times (T). In the counting information, the scintillator numbers (P), energy values (E), and detection times (T) are associated with module IDs that identify the PET detector modules 11.

Return to the explanation of FIG. 2. The CT gantry device 2 according to the present embodiment is a device that detects X-rays transmitted through the subject P to generate X-ray projection data serving as a source of CT image data (X-ray CT image data). The CT gantry device 2 can also generate X-ray projection data serving as a source of a two-dimensional or three-dimensional scanogram.

FIG. 6 is a diagram illustrating an example of a configuration of the CT gantry device 2 according to the first embodiment. The CT gantry device 2 includes an X-ray tube 21, an X-ray detector 22, and a data acquisition circuitry 23, as illustrated in FIG. 6. The X-ray tube 21 generates an X-ray beam and irradiates the subject P with the generated X-ray beam. The X-ray detector 22 is a device that is placed at a position opposite to the X-ray tube 21 and detects X-rays transmitted through the subject P. Specifically, the X-ray detector 22 is a two-dimensional array-type detector that detects data on the two-dimensional intensity distribution of X-rays transmitted through the subject P (two-dimensional X-ray intensity distribution data). More specifically, in the X-ray detector 22, a plurality of detection element columns including a plurality of X-ray detection elements for a plurality of channels are arranged along a body axis direction of the subject P. The X-ray tube 21 and the X-ray detector 22 are supported by a rotating frame (not illustrated) in the CT gantry device 2.

The data acquisition circuitry 23 is a data acquisition system (DAS) that performs amplification processing and analog to digital (A/D) conversion processing on the two-dimensional X-ray intensity distribution data detected by the X-ray detector 22 to generate X-ray projection data. The data acquisition circuitry 23 then transmits the X-ray projection data to the console device 4.

Return to the explanation of FIG. 2. The couch 3 is a bed on which the subject P lays down, and includes a couchtop 31, a support frame 32, and a couch base 33. The couch 3 moves the subject P sequentially to an imaging bore of each of the CT gantry device 2 and the PET gantry device 1 based on instructions, which are transmitted via the console device 4 by an operator of the PET-CT scanner 100. In other words, the PET-CT scanner 100 performs, by controlling the couch 3, imaging to obtain CT image data first and thereafter performs imaging to obtain PET image data. In FIG. 2, the example of the CT gantry device 2 is installed closer to the couch 3 side than the PET gantry device 1 is, but the embodiment is not limited thereto, and the PET gantry device 1 may also be installed closer to the couch 3 side than the CT gantry device 2 is.

The couch 3 moves, by a drive mechanism (not illustrated), the couchtop 31 and the support frame 32 in a direction of the central axis of the detector field of view in the CT gantry device 2 and PET gantry device 1. In other words, the couch 3 moves the couchtop 31 and the support frame 32 in a direction along the longitudinal direction of the couchtop 31 and the support frame 32.

Figure 7:
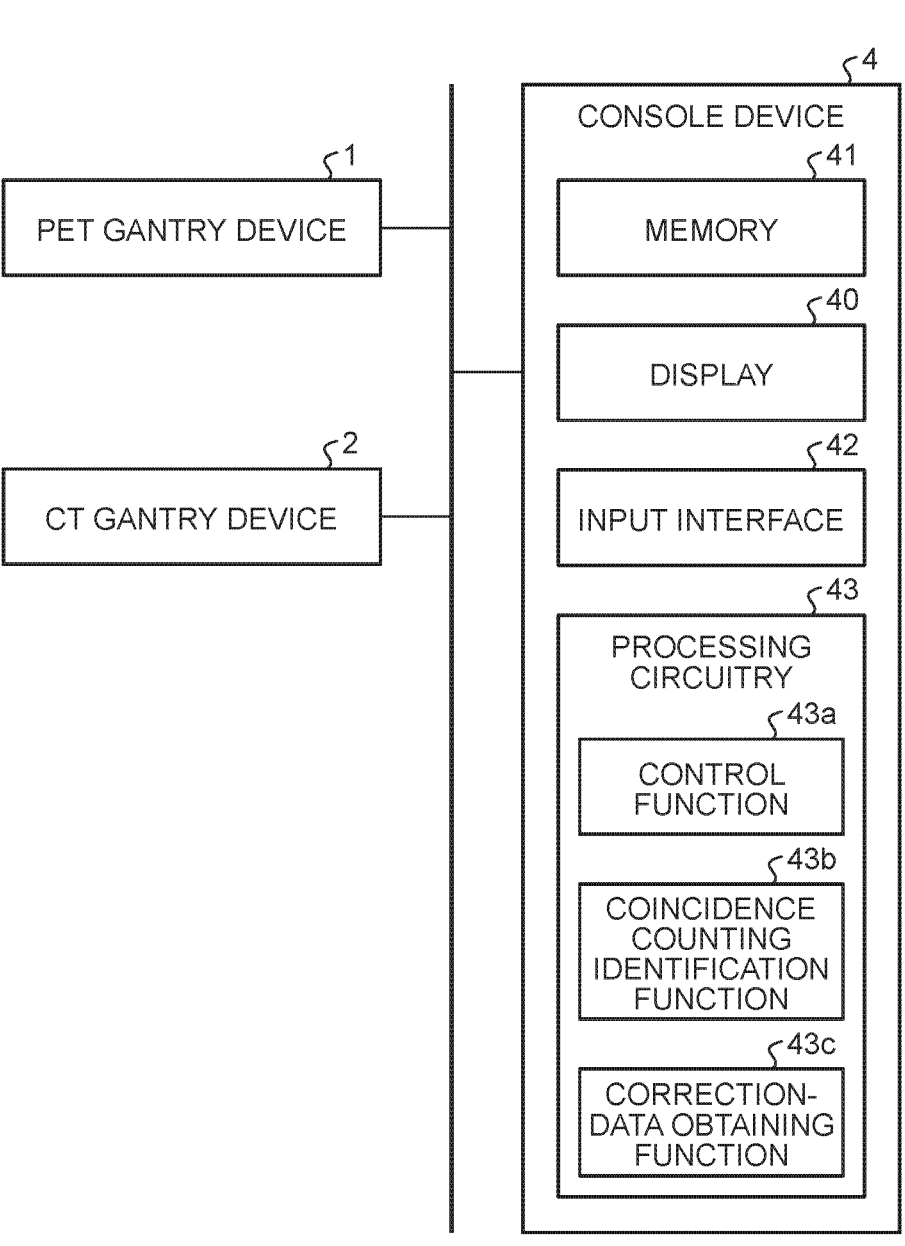
FIG. 7 is a diagram illustrating an example of a configuration of a console device according to the first embodiment.

The console device 4 is a device that receives instructions from the operator and controls processing executed by the PET-CT scanner 100. FIG. 7 is a diagram illustrating an example of a configuration of the console device 4 according to the first embodiment. As illustrated in FIG. 7, the console device 4 includes a display 40, a memory 41, an input interface 42, and a processing circuitry 43.

The display 40 displays a graphical user interface (GUI) for the operator of the PET-CT scanner 100 to input various setting requests by using the input interface 42. The display 40 also displays PET images and other data represented by the PET image data through display control executed by a control function 43a. The display 40 also displays various messages and display information to notify the operator of the processing status and processing results. The display 40 can also include a speaker to output audio.

The memory 41 stores the counting information transmitted from the PET gantry device 1. The counting information is used for processing executed by a coincidence counting identification function 43b. The counting information stored in the memory 41 may be deleted from the memory 41 after being used for the processing executed by the coincidence counting identification function 43b. In addition, the counting information stored in the memory 41 may be deleted after being stored for a certain period of time.

The memory 41 also stores coincidence counting information, which is generated by the coincidence counting identification function 43*b* and will be described later. The memory 41 also stores the PET image data transmitted from the image reconstruction apparatus 200. The memory 41 also stores the X-ray projection data transmitted from the data acquisition circuitry 23. The memory 41 also stores data or the like, which is used by the processing circuitry 43 to control the overall processing executed by the PET-CT scanner 100. The memory 41 also stores computer programs executed by the processing circuitry 43. The memory 41 is implemented by, for example, a semiconductor memory such as a flash memory, a hard disk, an optical disc, or the like. The memory 41 is an example of a storage unit.

The input interface 42 is implemented by a trackball, a switch button, a mouse, a keyboard, a joystick, a touch pad for input operation by a touch of an operation surface, a touch screen in which a display screen and a touch pad are integrated, a non-contact input circuitry using an optical sensor, a voice input circuitry, and other interfaces, which are used for making various settings and the like. The input interface 42 is connected to the processing circuitry 43, converts input operations received from the operator into electrical signals, and outputs the electrical signals to the processing circuitry 43. In the present specification, the input interface 42 is not limited only to those with physical operating components such as a mouse and a keyboard. For example, an electrical signal processing circuitry that receives electrical signals corresponding to input operations input from an external input device provided separately from the device and outputs these electrical signals to the processing circuitry 43 is also an example of the input interface.

The processing circuitry 43 performs the control of the entire PET-CT scanner 100. For example, the processing circuitry 43 performs the control function 43*a*, the memory 41, and a correction-data obtaining function 43*c*, as illustrated in FIG. 7. Here, for example, each of processing functions executed by the control function 43*a*, the coincidence counting identification function 43*b*, and the correction-data obtaining function 43*c*, which are components of the processing circuitry 43 illustrated in FIG. 7, is recorded in the memory 41 in the form of a computer program executable by a computer. The processing circuitry 43 is a processor, which reads each computer program from the memory 41 and executes the computer program to implement a function corresponding to each computer program. In other words, the processing circuitry 43 with each computer program read out has each function in the processing circuitry 43 illustrated in FIG. 7.

The term "processor" means a circuitry such as a central processing unit (CPU), a graphics processing unit (GPU), an application specific integrated circuit (ASIC), or a programmable logic device (for example, simple programmable logic device (SPLD), complex programmable logic device (CPLD), and field programmable gate array (FPGA)), for example. The processor reads and executes the computer programs stored in the memory 41 to execute the functions. Instead of storing the computer programs in the memory 41, the computer programs may be configured to be incorporated directly into the circuitry of the processor. In this case, the processor reads and executes the computer programs incorporated in the circuitry to execute the functions thereof. Each processor of the present embodiment is not limited to the configuration of a single circuitry provided for each processor, but may also employ the configuration of a single processor formed of a plurality of independent circuitries in combination to execute the functions thereof.

The control function 43*a* controls the operation of the PET-CT scanner 100. For example, the control function 43*a* receives instructions from the operator via the input interface 42 and controls the PET gantry device 1, the CT gantry device 2, and the couch 3 according to the received instructions to perform each of the following processes of: acquiring a scanogram, scanning (main imaging), reconstructing an image, generating an image, and displaying an image. The control function 43*a* is an example of a control unit or a display control unit.

The coincidence counting identification function 43*b* generates a time-series list of the coincidence counting information by using a plurality of pieces of counting information stored in the memory 41. For example, the coincidence counting identification function 43*b* searches for sets of counting information obtained by counting pair annihilation gamma rays at almost the same time in the pieces of counting information based on a detection time (T) of the counting information. In other words, the coincidence counting identification function 43*b* identifies the sets of counting information obtained by counting pair annihilation gamma rays at almost the same time in the pieces of counting information. The coincidence counting identification function 43*b* then generates coincidence counting information for each set of counting information identified, arranges the generated coincidence counting information in approximately time-series order, and stores the coincidence counting information in the memory 41.

FIG. 8 is a diagram illustrating an example of a time-series list of coincidence counting information in the first embodiment. As illustrated in FIG. 8, the memory 41 stores sets of counting information in association with "COINCIDENCE No." which is the serial number of the coincidence counting information. In the first embodiment, the time-series list of the coincidence counting information is arranged in approximately time-series order based on the detection time (T) of the counting information.

For example, the coincidence counting identification function 43*b* generates coincidence counting information based on a condition (condition for generating coincidence counting information) input by the operator during the generation of the coincidence counting information. The time window width is specified in the condition for generating coincidence counting information. For example, the coincidence counting identification function 43*b* generates coincidence counting information based on the time window width. In this way, the coincidence counting identification function 43*b* generates coincidence counting information to acquire the coincidence counting information.

For example, the coincidence counting identification function 43*b* refers to the memory 41 and searches for the sets of counting information with the time difference in the detection time (T) being within the time window width, in the PET detector modules 11. For example, in a case in which the coincidence counting identification function 43*b* searches for the sets of "P11, E11, T11" and "P22, E22, T22" as sets that satisfy the condition for generating coincidence counting information, the coincidence counting identification function 43*b* generates these sets as coincidence counting information and stores the sets in the memory 41. The coincidence counting identification function 43*b* may generate the coincidence counting information by using the energy window width along with the time window width. The coincidence counting identification function 43*b* may be provided within the PET gantry device 1.

In the present embodiment, the coincidence counting identification function 43*b* transmits the time-series list of the generated coincidence counting information to the image reconstruction apparatus 200 via the network 300. In the following description, the coincidence counting information corresponding to an i-th line of response (LOR) may be denoted as "detection data $g_i$". Here, in the present embodiment, the total number of the line of responses is "N1". Therefore, the value of "i" can be within a range of "1" to "N1".

The correction-data obtaining function 43c obtains X-ray projection data stored in the memory 41, and reconstructs the obtained X-ray projection data to obtain CT reconstruction image data as correction data. Here, the correction data is used to reconstruct the PET image data. The correction data includes, for example, attenuation maps, u-maps, or the like. The correction-data obtaining function 43c transmits the generated correction data to the image reconstruction apparatus 200 via the network 300.

Figure 9:
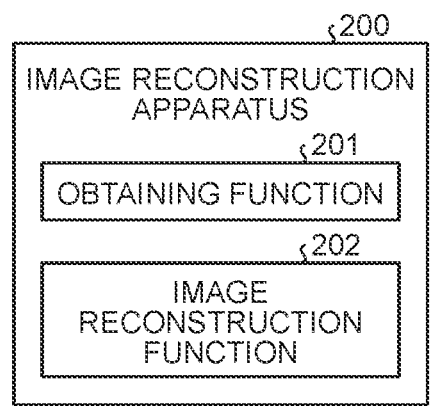
FIG. 9 is a diagram illustrating an example of a configuration of an image reconstruction apparatus according to the first embodiment.

FIG. 9 is a diagram illustrating an example of a configuration of the image reconstruction apparatus 200 according to the first embodiment. For example, the image reconstruction apparatus 200 is an annealing machine. The annealing machine includes a quantum annealing computer serving as a quantum computer and a simulated annealing computer serving as a classical computer. Another specific example of the annealing machine is a computer commonly referred to as an Ising machine.

The image reconstruction apparatus 200 may handle an Ising model Hamiltonian as an objective function. The image reconstruction apparatus 200 is provided with an obtaining function 201 and an image reconstruction function 202.

The obtaining function 201 obtains the detection data $g_i$ transmitted by the coincidence counting identification function 43b.

Figure 10:
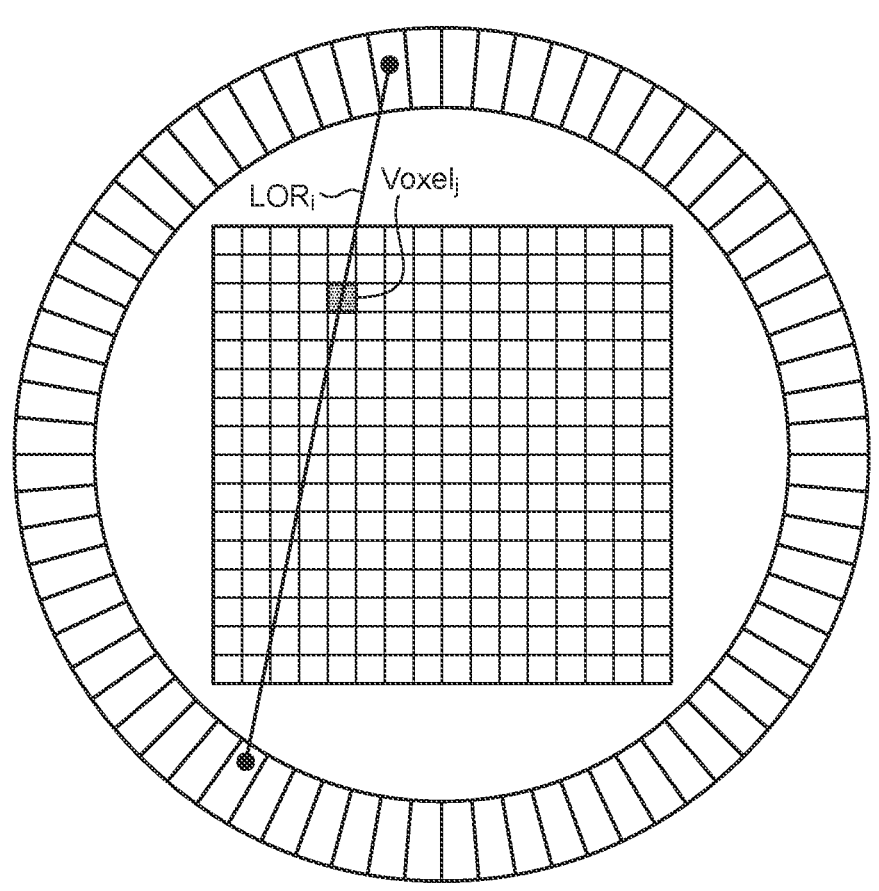
FIG. 10 is a diagram illustrating an example of a system matrix according to the first embodiment.

The image reconstruction function 202 uses a system matrix $C_{ij}$ that describes the probability relationship between a positron emission event at a point in the detector field of view and a detection event of pair annihilation gamma rays with the line of response, as in statistical image reconstruction methods in the related art. FIG. 10 is a diagram illustrating an example of the system matrix $C_{ij}$ according to the first embodiment. The system matrix $C_{ij}$ is the probability that pair annihilation gamma rays emitted from $Voxel_j$ illustrated in FIG. 10 are detected in $LOR_i$ illustrated in FIG. 10. Here, $Voxel_j$ refers to the j-th pixel (voxel). The total number of pixels in the present embodiment is "N2". Therefore, the value of "j" can be within a range of "1" to "N2". $LOR_i$ refers to the i-th line of response.

The system matrix $C_{ij}$ is composed of factors representing the physical processes from the positron emission to the detection of pair annihilation gamma rays, such as a detection probability matrix based on detector geometry, a positron range matrix, a gamma ray detection efficiency factor for the detector elements, and a gamma ray attenuation coefficient by subject. Some factors of these factors may be used to pre-correct the detection data $g_i$, not to the system matrix $C_{ij}$.

Here, as illustrated in expression (1) below, the system matrix $C_{ij}$ is used to calculate the forward projection $\Sigma_i C_{ij}\lambda_j$ from a pixel value $\lambda_j$ representing the radiation concentration distribution assumed in the detector field of view to $LOR_i$, and the sum H of the square of the difference between the detection data $g_i$ obtained from $LOR_i$ and $\Sigma_i C_{ij}\lambda_j$ is defined as an objective function.

$$H \equiv \sum_i \left( g_i - \sum_j C_{ij}\ \lambda_j \right)^2 \tag{1}$$

The pixel value $\lambda_j$ is a pixel value of the j-th pixel. Thus, an PET image reconstruction problem is defined as a pixel value combinatorial optimization problem that minimizes the objective function H. In a case in which the right-hand side of expression (1) mentioned above is expanded and organized for each order of the pixel value $\lambda_j$, the following expression (2) is obtained.

$$H = \sum_i g_i^2 - 2\sum_{ij} g_i\ C_{ij}\lambda_j + \sum_i \left( \sum_j C_{ij}\ \lambda_j \right)^2 \tag{2}$$

$$= \sum_i g_i^2 + \sum_j \left( \sum_i (-2) \cdot g_i C_{ij} \right)\lambda_j + \sum_i \left( \sum_{jk} C_{ij}\ C_{ik} \right)\lambda_j\ \lambda_k$$

Here, in a case of setting the following group of expressions (3), the PET image reconstruction problem is formulated as a combinatorial optimization problem, which is referred to as the "constrained quadratic model" in which the spin variables of the Ising model are expanded to integers, by the objective function H based on the Ising model illustrated in expression (4) below.

$$G = \sum_i g_i^2 \tag{3}$$

$$h_j = (-2) \cdot \sum_i g_i C_{ij}$$

$$J'_{jk} = 2\sum_i C_{ij}\ C_{ik}\ (j \neq k)$$

$$J'_{jk} = \sum_i C_{ij}\ C_{ik}\ (j = k)$$

$$H = G + \sum_j h_j\ \lambda_j + \sum_{j \leq k} J'_{jk}\lambda_j\lambda_k \tag{4}$$

As such, the image reconstruction function 202 obtains $\lambda_1, \lambda_2, \ldots, \lambda_{N2}$ in a case in which the objective function H illustrated in expression (4) is minimized to reconstruct the PET image data. In this way, the image reconstruction function 202 generates the PET image data. The image reconstruction function 202 then transmits the generated PET image data to the PET-CT scanner 100 via the network 300.

As mentioned above, in the present embodiment, the image reconstruction processing is explicitly formulated as an optimization problem to search for the subject model that best reproduces the detection data $g_i$. As mentioned above, the image reconstruction function 202 performs PET image reconstruction based on the objective function H that solves a combinatorial optimization problem. Specifically, the image reconstruction function 202 performs the PET image reconstruction by solving the combinatorial optimization problem based on the objective function H into which the detection data $g_i$ is incorporated. The objective function H is an Ising model Hamiltonian. In addition, the objective function H includes a constant term, which is a first term on the right-hand side of expression (4), a bias term, which is a second term, and a coupling term, which is a third term. The constant term is a term based on the detection data $g_i$. The bias term is a term based on the detection data $g_i$ and the system matrix $C_{ij}$. The coupling term is a term based on the system matrix $C_{ij}$.

The obtaining function 201 may obtain the correction data transmitted from the PET-CT scanner 100, and the image reconstruction function 202 may use the correction data to correct the PET image data when performing the PET image reconstruction.

Figure 11:
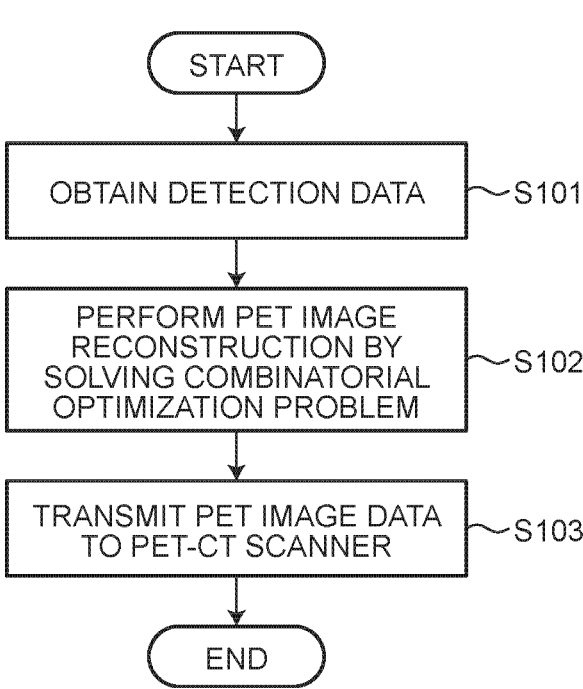
FIG. 11 is a flowchart illustrating an example of the process flow executed by the image reconstruction apparatus according to the first embodiment.

FIG. 11 is a flowchart illustrating an example of the process flow executed by the image reconstruction apparatus 200 according to the first embodiment.

As illustrated in FIG. 11, the obtaining function 201 obtains the detection data $g_i$ transmitted from the PET-CT scanner 100 (step S101). The image reconstruction function 202 then performs the PET image reconstruction by solving the combinatorial optimization problem based on the objective function H into which the detection data $g_i$ is incorporated to generate PET image data (step S102). The image reconstruction function 202 then transmits the generated PET image data to the PET-CT scanner 100 via the network 300 (step S103), and the processing illustrated in FIG. 11 is completed.

As mentioned above, the image reconstruction method and image reconstruction processing system 400 according to the first embodiment have been described. In the first embodiment, the image reconstruction apparatus 200, which is a quantum computer or pseudo-quantum computer, performs the PET image reconstruction by solving the combinatorial optimization problem based on the objective function H into which the detection data $g_i$ is incorporated to generate PET image data. Therefore, according to the first embodiment, the PET image data can be generated in a much shorter time than the time required for the statistical image reconstruction process in the related art, and the imprecision of the convergence criteria for the pixel values can be removed. In other words, according to the first embodiment, the time required for the PET image reconstruction can be reduced while removing the imprecision of the convergence criteria for the pixel values.

Furthermore, according to the first embodiment, in the whole-body field of view, multi-frame dynamic image reconstruction can be performed immediately. As a result, since the operator can understand drug dynamics in real time, it can be expected to improve the speed and flexibility of medical measures.

In addition, according to the first embodiment, cloud computing without a local console is used. Therefore, it is expected to save space in laboratories and operation rooms, improve ease of installation, and reduce the cost of a complete set of equipment. According to these, it can also pave the way for new ways of diagnostic imaging.

Second Embodiment

Next, the image reconstruction apparatus 200 may further perform scatter coincidence correction and random coincidence counting correction. Such an embodiment will be described as the second embodiment. In the description of the second embodiment, the description of the same configurations as those in the first embodiment will not be repeated.

For example, as illustrated in an objective function H' in the following group of expressions (5), the result obtained by subtracting a scatter coincidence counting $S_i$ and a random coincidence counting $R_i$ from the detection data $g_i$ is subjected to the image reconstruction.

$$H' \equiv \sum_i \left( (g_i - S_i - R_i) - \sum_j C_{ij} \ \lambda_j \right)^2 \qquad (5)$$

$$G' = \sum_i (g_i - S_i - R_i)^2$$

$$h'_j = (-2) \cdot \sum_i (g_i - S_i - R_i) C_{ij}$$

The scatter coincidence counting $S_i$ and random coincidence counting $R_i$ are obtained by known techniques. For example, the scatter coincidence counting $S_i$ is obtained by a Monte Carlo simulation. The random coincidence counting $R_i$ is obtained by a simulation using counting information. For example, the scatter coincidence counting $S_i$ is a scatter coincidence counting component corresponding to $LOR_i$. For example, the random coincidence counting $R_i$ is a random coincidence counting component corresponding to $LOR_i$.

Thus, an PET image reconstruction problem is defined as a pixel value combinatorial optimization problem that minimizes the objective function H'. From the expression for the objective function H' in the above-mentioned group of expressions (5), the objective function H' based on the Ising model illustrated in expression (6) below is obtained.

$$H' = G' + \sum_j h'_j \lambda_j + \sum_{j \leq k} J'_{jk} \lambda_j \lambda_k \qquad (6)$$

The PET image reconstruction problem is formulated as a combinatorial optimization problem, which is referred to as the "constrained quadratic model", by the objective function H' based on the Ising model. The objective function H' illustrated in expression (6) is an Ising model Hamiltonian. In addition, the objective function H' based on the Ising model illustrated in expression (6) includes a constant term, which is a first term on the right-hand side of expression (6), a bias term, which is a second term, and a coupling term, which is a third term. The constant term is a term based on the detection data $g_i$. The bias term is a term based on the detection data $g_i$ and the system matrix $C_{ij}$. The coupling term is a term based on the system matrix $C_{ij}$. The constant term includes a scatter coincidence counting component and a random coincidence counting component. The bias term also includes a scatter coincidence counting component and a random coincidence counting component.

The image reconstruction function 202 obtains $\lambda_1$, $\lambda_2, \ldots, \lambda_{N2}$ in a case in which the objective function H' illustrated in expression (6) is minimized to reconstruct the PET image data. In this way, the image reconstruction function 202 generates the PET image data. The image reconstruction function 202 then transmits the generated PET image data to the PET-CT scanner 100 via the network 300.

As mentioned above, the image reconstruction method and image reconstruction processing system 400 according to the second embodiment have been described. According to the second embodiment, the scatter coincidence counting correction and random coincidence counting correction are performed on the PET image data, and the same effects as those in the first embodiment can be achieved.

In the first and second embodiments, the PET-CT scanner 100 may be provided with a device similar to the image reconstruction apparatus 200. In other words, the PET image data may be generated within the PET-CT scanner 100 by a device similar to the image reconstruction apparatus 200.

Here, a processing program executed by a processor is provided to be incorporated in advance in a read only memory (ROM), a storage unit, or other memories. This processing program may be stored and provided in a format that can be installed in these devices or as a file in an executable format in a computer-readable storage medium, such as a compact disc (CD)-ROM, flexible Disk (FD), CD-recordable (R), digital versatile disc (DVD), or other storage medium. This processing program may also be stored in a computer connected to a network, such as the Internet, and may be provided or distributed by downloading via the network. For example, this processing program constitutes modules that include each of functional units described below. As for the actual hardware, the CPU reads and executes the computer program from a storage medium such as a ROM, and each module is loaded in the main storage device and generated in the main storage device.

Each of the components of each of the devices illustrated in the above-mentioned embodiments is a functional concept, and does not necessarily has the physical configuration as illustrated in the figures. That is, the specific form of distribution and integration of each of the devices is not limited to those illustrated in the figures, and all or parts thereof can be functionally or physically distributed and integrated in any units according to various loads and usage conditions. Furthermore, each of the processing functions performed by each of the devices can be implemented, in all or any parts thereof, by CPU and a computer program analyzed and executed by the CPU, or by hardware using wired logic.

According to at least one of the embodiments mentioned above, the time required for the PET image reconstruction can be reduced while removing the imprecision of the convergence criteria for the pixel values.

Regarding the above embodiments, the following notes are disclosed as an aspect and selective feature of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reconstruction method of performing PET image reconstruction based on an objective function that solves a combinatorial optimization problem, the method comprising:

obtaining detection data; and performing PET image reconstruction by solving a combinatorial optimization problem based on the objective function into which the detection data is incorporated, wherein the objective function includes a constant term, a bias term, and a coupling term, the constant term is a term based on the detection data, the bias term is a term based on the detection data and a system matrix, and the coupling term is a term based on the system matrix.

2. The image reconstruction method according to claim 1, wherein the objective function is an Ising model Hamiltonian.

3. The image reconstruction method according to claim 1, wherein the system matrix describes a probability relationship between a positron emission event at a point in a detector field of view and a detection event of pair annihilation gamma rays with a line of response.

4. The image reconstruction method according to claim 1, wherein the constant term includes a scattering coincidence counting component.

5. The image reconstruction method according to claim 1, wherein the constant term includes a random coincidence counting component.

6. The image reconstruction method according to claim 1, wherein the bias term includes a scattering coincidence counting component.

7. The image reconstruction method according to claim 1, wherein the bias term includes a random coincidence counting component.

8. The image reconstruction method according to claim 1, wherein the constant term includes a scattering coincidence counting component and a random coincidence counting component, and the bias term includes a scattering coincidence counting component and a random coincidence counting component.

9. The image reconstruction method according to claim 1, wherein the obtaining detection data and the performing PET image reconstruction are performed by an annealing machine.

10. The image reconstruction method according to claim 9, wherein the annealing machine is a quantum annealing computer, a simulated annealing computer, or an Ising machine.

11. An image reconstruction processing system comprising:

a medical diagnostic imaging apparatus configured to obtain detection data; and processing circuitry configured to perform image reconstruction based on the detection data, the processing circuitry being connected to the medical diagnostic imaging apparatus via a network, wherein in the processing circuitry, image reconstruction is performed based on processing executed by executing an image reconstruction method of performing image reconstruction based on an objective function that solves a combinatorial optimization problem by a quantum computer, wherein the objective function includes a constant term, a bias term, and a coupling term, the constant term is a term based on the detection data, the bias term is a term based on the detection data and a system matrix, and the coupling term is a term based on the system matrix.

* * * * *